United States Patent
Kaneko et al.

(10) Patent No.: US 7,321,295 B2
(45) Date of Patent: Jan. 22, 2008

(54) ADAPTER FOR AUTOMOBILE USE AND IN-VEHICLE SYSTEM USING THIS ADAPTER

(75) Inventors: Koichiro Kaneko, Tokyo (JP); Satoshi Yoshida, Tokyo (JP)

(73) Assignee: Kanack Planning Corporation, Tokyo (JP)

( * ) Notice: Subject to any disclaimer, the term of this patent is extended or adjusted under 35 U.S.C. 154(b) by 186 days.

(21) Appl. No.: 11/137,580

(22) Filed: May 26, 2005

(65) Prior Publication Data

US 2006/0063397 A1    Mar. 23, 2006

(30) Foreign Application Priority Data

Sep. 22, 2004    (JP)    ............... 2004-275155

(51) Int. Cl.
*B60K 35/00* (2006.01)
(52) U.S. Cl. ............. 340/459; 340/538.15; 340/538.17
(58) Field of Classification Search ................ 340/459, 340/538.15, 538.17, 310.16
See application file for complete search history.

(56) References Cited

U.S. PATENT DOCUMENTS 6,563,418 B1 * 5/2003 Moon ...................... 370/475
7,053,866 B1 * 5/2006 Mimran ...................... 345/8

FOREIGN PATENT DOCUMENTS

| JP | 2000-286874 | 10/2000 |
|----|-------------|---------|
| JP | 2000-332807 | 11/2000 |
| JP | 2001-136190 | 5/2001  |
| JP | 2002-321573 | 11/2002 |
| JP | 2003-198546 | 7/2003  |
| JP | 2003-309509 | 10/2003 |
| JP | 2004-104613 | 4/2004  |
| JP | 2004-104705 | 4/2004  |

\* cited by examiner

*Primary Examiner*—Davetta W. Goins
(74) *Attorney, Agent, or Firm*—Oblon, Spivak, McClelland, Maier & Neustadt, P.C.

(57) ABSTRACT

A signal processing section 11 decodes an in-vehicle device signal S3 supplied to signal input terminals 141 to 14n and generates a decoded signal S2. An output terminal 13 is connected with a terminal device 30 and receives the decoded signal S2 generated by the signal processing section 11.

5 Claims, 3 Drawing Sheets

ADAPTER FOR AUTOMOBILE USE AND IN-VEHICLE SYSTEM USING THIS ADAPTER

TECHNICAL FIELD

The present invention relates to an adapter for automobile use and an in-vehicle system using this adapter. The adapter for automobile use according to the present invention is used to decode an operating state of an in-vehicle device.

BACKGROUND OF THE INVENTION

As an in-vehicle system for automobiles, there is known an in-vehicle system which displays an operating state of a genuine in-vehicle device in a genuine in-vehicle display unit. Further, there is a case where genuine in-vehicle devices such as an in-vehicle audio device, an in-vehicle air conditioner, a genuine in-vehicle display unit and others are connected with each other through a LAN (Local Area Network) to constitute an in-vehicle LAN system. It is to be noted that the term "genuine" is used to specify a device equipped by an automobile manufacturer at the time of shipment.

Such in-vehicle LAN systems may take a configuration in which one of various kinds of genuine in-vehicle devices connected through the LAN is utilized as a main genuine in-vehicle device in order to display an operating state of itself or any other genuine in-vehicle device.

Meanwhile, in an in-vehicle system, a need in the market for replacing an existing main genuine in-vehicle device with another new non-genuine in-vehicle device is very high.

However, since a non-genuine in-vehicle device does not have a circuit configuration which can cope with a genuine in-vehicle display unit, its operating state cannot be displayed in the genuine in-vehicle display unit.

Further, in the above-described in-vehicle LAN system, when a main genuine in-vehicle device is replaced with a non-genuine in-vehicle device, operating states of all in-vehicle devices constituting the in-vehicle LAN system cannot be displayed.

SUMMARY OF THE INVENTION

It is an object of the present invention to provide an adapter for automobile use which can decode operating states of any other genuine in-vehicle device and non-genuine in-vehicle device even if a main genuine in-vehicle device is replaced with a non-genuine in-vehicle device, and an in-vehicle system using this adapter.

In order to achieve this object, according to the present invention, there is provided an adapter for automobile use comprising: a signal input terminal; a signal processing section; and an output terminal. The signal processing section decodes a signal supplied to the signal input terminal and generates a decoded signal. The output terminal is a terminal which is connected with a terminal device and to which the decoded signal generated by the signal processing section is supplied.

The adapter for automobile use according to the present invention is combined with a LAN and a terminal device to constitute an in-vehicle system. In this in-vehicle system, the LAN is connected with the signal input terminal. The terminal device is connected with the output terminal, receives the decoded signal and performs an operation corresponding to the decoded signal.

In this example, since the adapter for automobile use which is utilized in the in-vehicle system comprises the signal input terminal and the output terminal, the LAN can be connected with the signal input terminal and the terminal device can be connected with the output terminal.

When a LAN signal is supplied to the signal input terminal, the signal processing section of the adapter for automobile use can decode the LAN signal and generate a decoded signal corresponding to an operation of an in-vehicle device connected with the LAN. The output terminal outputs the decoded signal generated by the signal processing section. The terminal device is connected with the output terminal, receives the decoded signal and performs an operation corresponding to the decoded signal.

Therefore, according to the in-vehicle system of the present invention, even if a main genuine in-vehicle device is replaced with a non-genuine in-vehicle device, operating states of any other genuine in-vehicle device and non-genuine in-vehicle device can be decoded.

As another mode, the adapter for automobile use according to the present invention can be combined with an in-vehicle device which is not connected with a LAN and a terminal device to constitute the in-vehicle system. In this in-vehicle system, an in-vehicle device is connected with the signal input terminal. The terminal device is connected with the output terminal, receives a decoded signal and performs an operation corresponding to the decoded signal.

Since the adapter for automobile use which is utilized in the in-vehicle system comprises the signal input terminal and the output terminal, an in-vehicle device can be connected with the signal input terminal and a terminal device can be connected with the output terminal.

When an in-vehicle device signal output from an in-vehicle device is supplied to the signal input terminal, the signal processing section of the adapter for automobile use can decode the in-vehicle device signal and generate a decoded signal corresponding an operation of the in-vehicle device. The output terminal outputs the decoded signal generated by the signal processing section. The terminal device is connected with the output terminal, receives the decoded signal and carries out an operation corresponding to the decoded signal.

Therefore, in this in-vehicle system, when a main genuine in-vehicle device is replaced with a non-genuine in-vehicle device, the operating states of any other genuine in-vehicle device and the non-genuine in-vehicle device can be likewise decoded. Of course, the operating states of both genuine and non-genuine devices can be extensively decoded by providing the signal input terminal which receives a signal output from any other in-vehicle device to the adapter for automobile use according to the present invention.

Other features, effects and advantages of the present invention will be described in further detaile based on embodiments with reference to the accompanying drawings.

DESCRIPTION OF PREFERRED EMBODIMENT

Figure 1:
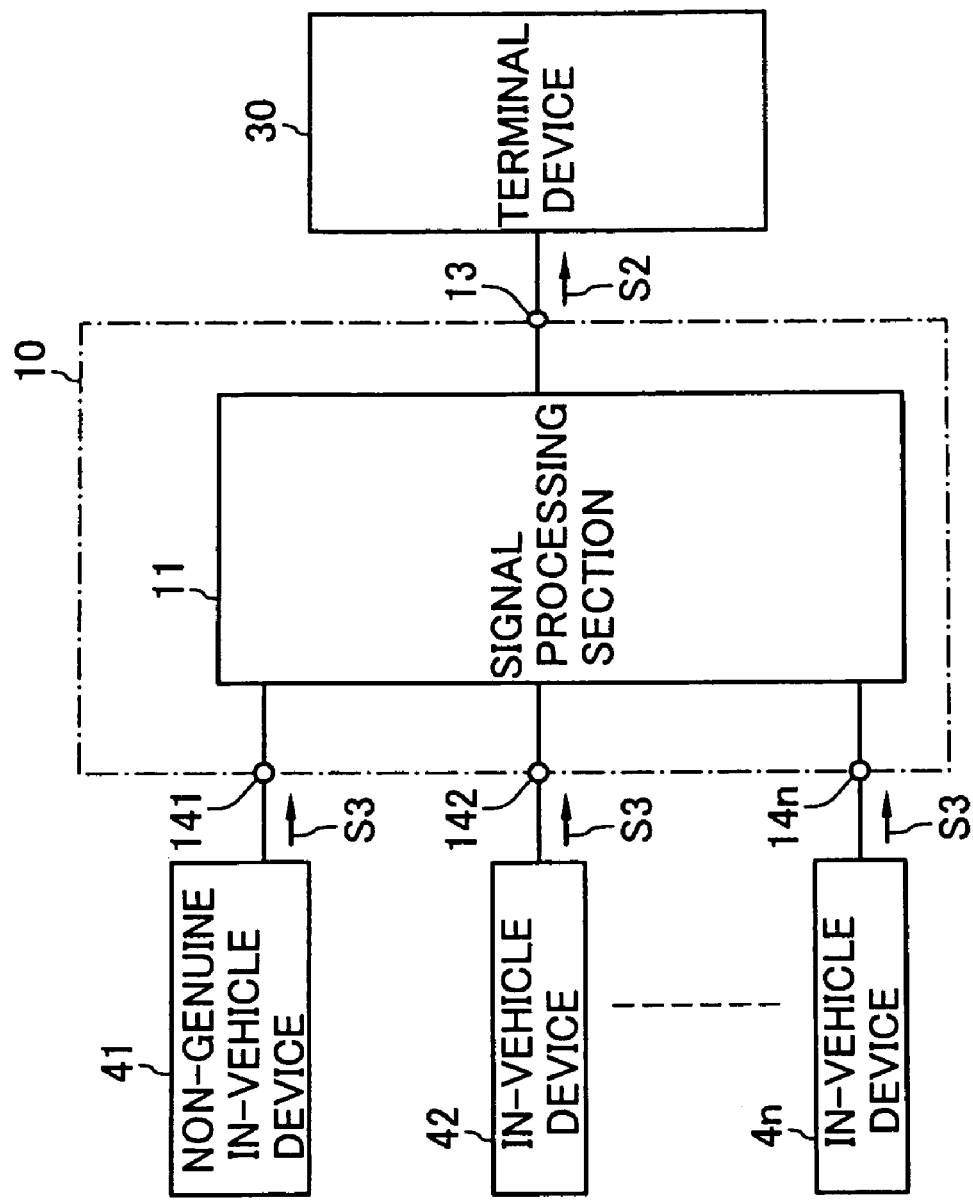
FIG. 1 is a block diagram showing an embodiment of an in-vehicle system according to the present invention.

FIG. 1 is a block diagram showing an embodiment of an in-vehicle system according to the present invention. The illustrated in-vehicle system has a configuration in which a main genuine in-vehicle device which is used to display an operating state of itself or any other in-vehicle device in a genuine in-vehicle display unit is removed and other in-vehicle devices 41 to 4n and an adapter for automobile use 10 according to the present invention are added.

The illustrated in-vehicle system comprises the in-vehicle devices 41 to 4n, a terminal device 30 and the adapter for automobile use 10. Each of the in-vehicle devices 41 to 4n is a device which is not connected to a LAN. Each of the in-vehicle devices 41 to 4n is generally a genuine in-vehicle device, but it may be a non-genuine in-vehicle device.

As the in-vehicle devices 41 to 4n, there are, e.g., various kinds of sensors, a non-genuine audio device, a non-genuine reproduction device and others. As the sensors, all sensors which are equipped in a car to detect a vehicle speed, the number of engine revolutions, a remaining quantity of an oil, a traveling distance, a tire pressure, an altitude and others as well as an in-vehicle temperature and an in-vehicle humidity are covered. In the drawing, the in-vehicle device (a non-genuine in-vehicle device) 41 is, e.g., a non-genuine in-vehicle audio device.

The adapter for automobile use 10 comprises a signal processing section 11, signal input terminals 141 to 14n (n is a number) and an output terminal 13. In the drawing, the signal input terminals 141 to 14n are in-vehicle device signal input terminals. The in-vehicle device signal input terminals 141 to 14n are terminals which connect the in-vehicle devices 41 to 4n.

The output terminal 13 is a terminal which is connected with the terminal device 30. The signal processing section 11 may be constituted by using, e.g., an electric circuit or by using software.

It is preferable for the terminal device 30 to be a genuine in-vehicle device. The terminal device 30 has the function of displaying a character, a figure or the like corresponding to a decoded signal S2 as well as any other various functions. In the following, a display function will be mainly described. A still picture or a moving picture may be displayed. As the terminal device 30, there are, e.g., a liquid crystal display, a display panel using a light emitting diode and others.

As described above, in the in-vehicle system according to the present invention, since the adapter for automobile use 10 includes the signal input terminals 141 to 14n and the output terminal 13, the in-vehicle devices 41 to 4n can be connected to the signal input terminals 141 to 14n and the terminal device 30 can be connected to the output terminal 13.

When an in-vehicle device signal S3 output from each of the in-vehicle devices 41 to 4n is supplied to each of the signal input terminals 141 to 14n, the signal processing section 11 of the adapter for automobile use 10 can decode the in-vehicle device signal S3 and generate a decoded signal S2 corresponding to an operation of each of the in-vehicle devices 41 to 4n. The output terminal 13 outputs the decoded signal S2 generated by the signal processing section 11. The terminal device 30 displays a character, a figure or the like corresponding to the decoded signal S2.

Since the adapter for automobile use 10 has the function of decoding the signal from the in-vehicle devices 41 to 4n, even if a main genuine in-vehicle device is replaced with a non-genuine in-vehicle device, an operating state of the replaced device can be displayed in the terminal device 30.

Figure 2:
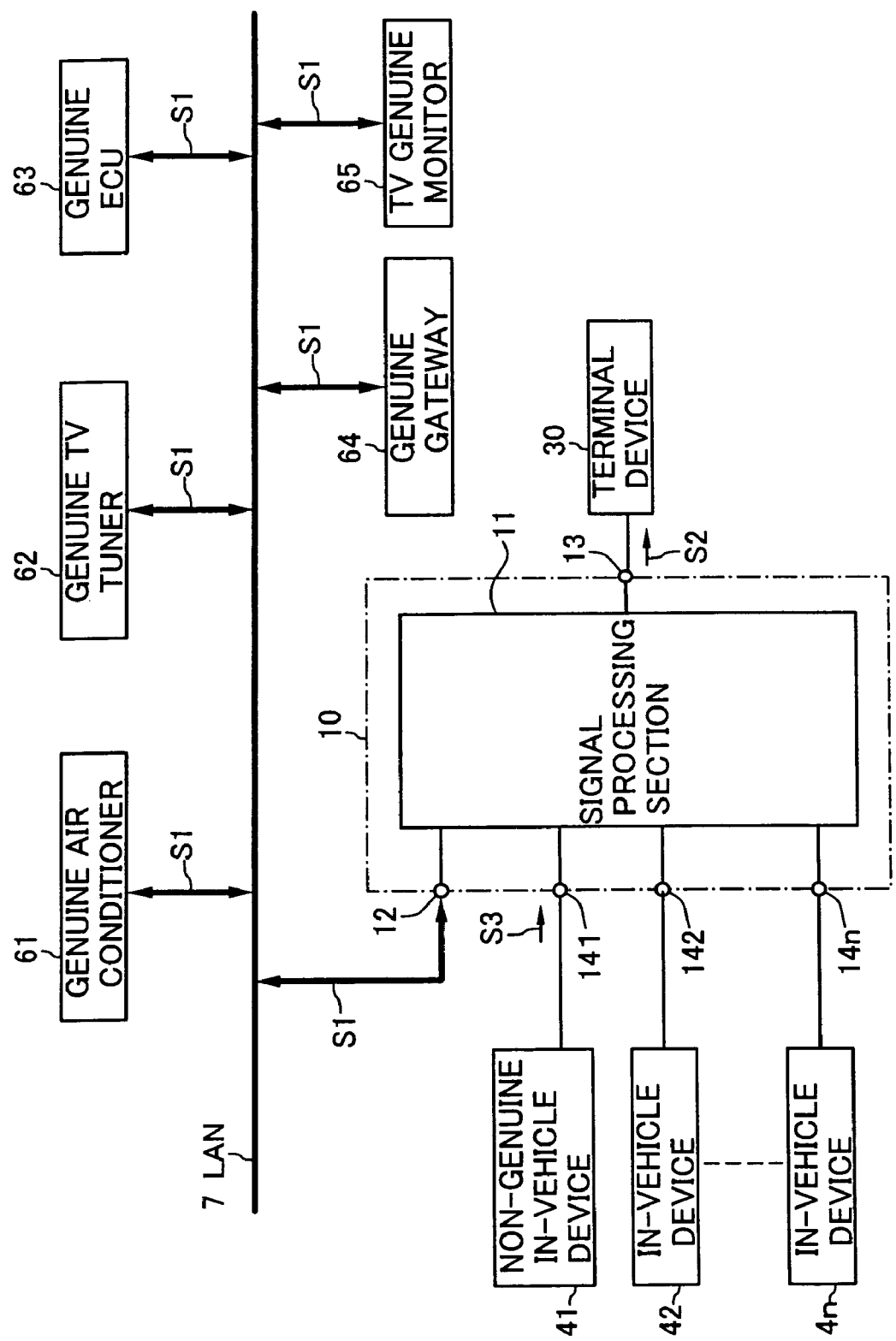
FIG. 2 is a block diagram showing another embodiment of the in-vehicle system according to the present invention.

FIG. 2 is a block diagram showing another embodiment of the in-vehicle system according to the present invention. In the drawing, same reference numerals denote parts equal to the constituent parts depicted in FIG. 1, thereby avoiding duplicated explanation.

The illustrated in-vehicle system comprises in-vehicle devices 41 to 4n, a LAN 7 in a car, in-vehicle devices 61 to 65, a terminal device 30 and an adapter for automobile use 10.

Each of the in-vehicle devices 61 to 65 is a genuine in-vehicle device, connected to the LAN 7 and has an address in the LAN assigned thereto. The illustrated in-vehicle devices 61 to 65 include an in-vehicle air conditioner 61, an in-vehicle TV tuner 62, an in-vehicle ECU (electrical control unit: an electric power controller or an electronic controller) 63, an in-vehicle gateway 64, and an in-vehicle TV monitor 65. The in-vehicle gateway 64 connects a system, a network and others having different protocols with each other so that data can be mutually exchanged. The in-vehicle device may include, e.g., an in-vehicle GPS (Global Positioning System) navigation device or the like.

Signal input terminals of the adapter for automobile use 10 includes in-vehicle device signal input terminals 141 to 14n and a LAN signal input terminal 12.

In the above-described in-vehicle system, each of the in-vehicle devices 61 to 65 operates based on a LAN signal S1 supplied from the LAN 7, and transmits a result of the operation and its own address as the LAN signal S1.

For example, the in-vehicle air conditioner 61 transmits a result of controlling temperature or humidity as the LAN signal S1, the in-vehicle TV tuner 62 transmits a result of measuring the sensitivity of TV airwaves as the LAN signal S1, and the in-vehicle TV monitor 65 transmits a result of controlling the luminosity, color saturation or brightness as the LAN signal S1.

The in-vehicle devices 41 to 4n transmit in-vehicle device signals S3 indicative of their own operating statuses or various detection signals. For example, the non-genuine in-vehicle device 41 constituted of a non-genuine in-vehicle audio device transmits its own operating status as the in-vehicle device signal S3. When each of the in-vehicle devices 41 to 4n is a reproduction device, the reproduction device transmits a reproduction status of a medium, e.g., a DVD as the in-vehicle device signal S3. When each of the in-vehicle devices 41 to 4n is a temperature measuring device, the temperature measuring device measures a temperature inside/outside a vehicle and transmits a measurement result as the in-vehicle device signal S3.

The adapter for automobile use 10 includes signal input terminals 12 and 141 to 14n. The LAN 7 and the in-vehicle devices 41 to 4n are connected to these signal input terminals 12, 141 to 14n.

When the LAN signal S1 and the in-vehicle device signal S3 are supplied to the signal input terminals 12 and 141 to 14n, the signal processing section 11 of the adapter for automobile use 10 decodes the LAN signal S1 and the in-vehicle device signal S3 and generates a decoded signal S2 corresponding to the operations of the in-vehicle devices 61 to 65 and the in-vehicle devices 41 to 4n. The output terminal 13 outputs the decoded signal S2 generated by the signal processing section 11.

The terminal device 30 receives the decoded signal S2 and performs a display corresponding to the decoded signal S2, i.e., display corresponding to the operations of the in-vehicle devices 61 to 65 and the in-vehicle devices 41 to 4n.

As described above, in the in-vehicle system according to the present invention, since the LAN signal decoding function and the in-vehicle device signal decoding function can be obtained by the adapter for automobile use 10, the operating states of the in-vehicle devices 61 to 65 connected to the LAN 7 can be displayed in the terminal device 30 even if the main genuine in-vehicle device is replaced with a non-genuine in-vehicle device.

Further, for example, when a language, protocol, or the like of the LAN signal and the in-vehicle device signal differs depending on a vehicle manufacturer, a vehicle family, or the like, the adapter for automobile use 10 according to the present invention may take a general-purpose configuration corresponding to all vehicle manufacturers, vehicle families, or the like, or take a configuration corresponding to each of vehicle manufacturers, vehicle families, or the like.

It is preferable that the terminal device 30 is connected with the LAN 7 and ON/OFF of a power supply or the like is controlled based on the LAN signal S1. Furthermore, the terminal device 30 may perform display corresponding to the decoded signal S2 and display of a picture of a TV program received by the in-vehicle TV tuner 62 or a picture reproduced by the non-genuine reproduction device 42.

Moreover, the terminal device 30 may also have a function of a device which controls a sensor of a vehicle speed, the number of engine revolutions and others, a function of a GPS navigation device and others as well as the display function. In this case, the terminal device 30 realizes various kinds of functions corresponding to the decoded signal S2, but a detailed explanation thereof is omitted.

Figure 3:
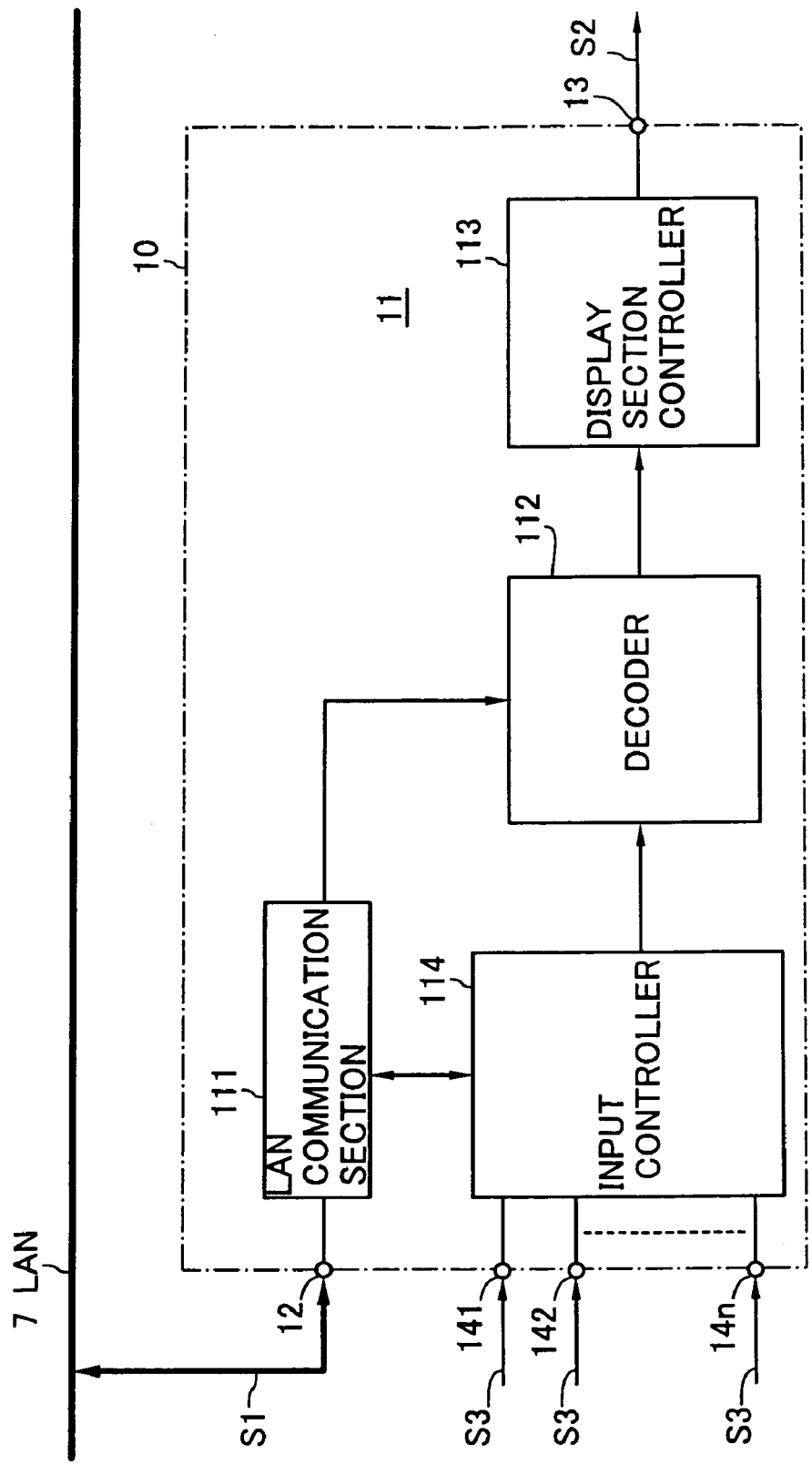
FIG. 3 is a block diagram illustrating an adapter for automobile use 10 depicted in FIG. 10 in further detail.

Additionally, it is preferable for the terminal device 30 to display information corresponding to operations of the in-vehicle devices 61 to 65 and the in-vehicle devices 41 to 4n in one display unit. That is because a driver of a vehicle can instantly grasp operating statuses of the in-vehicle devices 61 to 65 and the in-vehicle devices 41 to 4n FIG. 3 is a block diagram illustrating the adapter for automobile use 10 depicted in FIG. 2 in further detail. In FIG. 2, the signal processing section 11 of the adapter for automobile use 10 may be constituted by using an electric circuit or the like or by using software. The illustrated signal processing section 11 is constituted of an electric circuit, and includes a LAN communication section 111, a decoder 112, a display section controller 113 and an input controller 114.

The LAN communication section 111 supplies a LAN signal S1 to the decoder 112. The input controller 114 supplies an in-vehicle device signal S3 to the decoder 112. The decoder 112 decodes the LAN signal S1 and the in-vehicle device signal S3, and supplies a signal to the display section controller 113. The display section controller 113 outputs the supplied signal as a decoded signal S3.

Further, for example, an address on the LAN 7 can be allocated to each of the in-vehicle devices 41 to 4n by using the input controller 114. As a result, the in-vehicle device signal S3 can be supplied to the LAN 7 through the LAN communication section 111.

Furthermore, for example, the LAN signal S1 may be supplied to each of the in-vehicle devices 41 to 4n through the LAN communication section 111 and the input controller 114.

Although the above has concretely described the content of the present invention with reference to the preferred embodiments, persons skilled in the art can take various kinds of modifications based on basic technical concepts and teachings of the present invention.

What is claimed is:

1. An adapter for automobile use and constituting a non-genuine in-vehicle device different from a genuine in-vehicle gateway comprising:
    a signal input terminal;
    a signal processing section; and an output terminal, wherein;
    each of the signal input terminals is connected to a non-genuine in-vehicle device or a genuine in-vehicle device,
    the signal processing section decodes a non-genuine in-vehicle device signal and generates a decoded signal corresponding to an operation of each of the non-genuine in-vehicle devices, when an in-vehicle device signal output from each of the non-genuine in-vehicle devices is supplied to one of the signal input terminals, and
    the signal processing section decodes a genuine in-vehicle device signal and generates a decoded signal corresponding to an operation of each of the genuine in-vehicle devices, when an in-vehicle device signal output from the genuine in-vehicle devices is supplied to the other one of the signal input terminals, and
    the output terminal is a terminal which is connected with a terminal device and to which the decoded signals generated by the signal processing section are supplied.

2. The adapter for automobile use according to claim 1, wherein the signal input terminal includes a LAN signal input terminal.

3. The adapter for automobile use according to claim 1, wherein the signal input terminal includes an in-vehicle device signal input terminal.

4. An in-vehicle system comprising: an adapter for automobile use; a LAN; and a terminal device,
    wherein the adapter for automobile use is defined in claim 1,
    the LAN is connected with the signal input terminal, and
    the terminal device is connected with the output terminal.

5. An in-vehicle system comprising: an adapter for automobile use; an in-vehicle device; and a terminal device,
    wherein the adapter for automobile use is defined in claim 1,
    the in-vehicle device is connected with the signal input terminal, and
    the terminal device is connected with the output terminal.

* * * * *